(12) United States Patent
Dmitriev et al.

(10) Patent No.: US 8,570,324 B2
(45) Date of Patent: Oct. 29, 2013

(54) METHOD FOR WATERTIGHT EVALUATION OF AN APPROXIMATE CATMULL-CLARK SURFACE

(75) Inventors: Kirill Dmitriev, Moscow (RU); Henry Packard Moreton, Woodside, CA (US)

(73) Assignee: NVIDIA Corporation, Santa Clara, CA (US)

( * ) Notice: Subject to any disclaimer, the term of this patent is extended or adjusted under 35 U.S.C. 154(b) by 616 days.

(21) Appl. No.: 12/828,039

(22) Filed: Jun. 30, 2010

(65) Prior Publication Data

US 2011/0085736 A1    Apr. 14, 2011

Related U.S. Application Data

(60) Provisional application No. 61/250,832, filed on Oct. 12, 2009.

(51) Int. Cl.
   *G06T 15/00*   (2011.01)
(52) U.S. Cl.
   USPC .......... 345/427; 345/419; 345/420; 345/423; 345/582; 703/2
(58) Field of Classification Search
   USPC .............. 345/419, 420, 423, 427, 582; 703/2
   See application file for complete search history.

(56) References Cited

U.S. PATENT DOCUMENTS

| | | | |
|---|---|---|---|
| 7,200,532 B1 * | 4/2007 | Cheng ............................ | 703/2 |
| 7,274,364 B2 * | 9/2007 | Sederberg ...................... | 345/420 |
| 7,324,105 B1 * | 1/2008 | Moreton et al. ................ | 345/420 |
| 7,688,323 B2 * | 3/2010 | Ferguson et al. .............. | 345/473 |
| 7,952,575 B2 * | 5/2011 | Rosel ............................. | 345/420 |
| 8,144,147 B2 * | 3/2012 | Munkberg et al. ............. | 345/423 |
| 8,228,329 B2 * | 7/2012 | Maekawa et al. .............. | 345/423 |
| 8,294,726 B2 * | 10/2012 | Burley et al. .................. | 345/582 |

OTHER PUBLICATIONS

Loop et al, Approximating Catmull-Clark Subdivision Surfaces with Bicubic Patches, pp. 1-19, 2007.*
Lai et al, Similarity based Interpolation using Catmull-Clark Subdivision Surfaces, pp. 1-9, 2006.*
Zheng et al, Interpolation over Arbitrary Topology Meshes Using a Two-Phase Subdivision Scheme, pp. 301-310, 2006.*
Deng et al, A simple method for interpolating meshes of arbitrary topology by Catmull—Clark surfaces, pp. 137-146, Aug. 2009.*

* cited by examiner

*Primary Examiner* — Phu K Nguyen
(74) *Attorney, Agent, or Firm* — Patterson & Sheridan, L.L.P.

(57) ABSTRACT

One embodiment of the present invention sets forth technique for watertight evaluation of Gregory patches for Catmull-Clark subdivision surfaces. Each boundary of each patch within a subdivision surface is configured to be owned by one related patch. In general, a given patch may own specific control points for the patch, while certain other control points for the patch may need to be reconstructed because the control points are owned by an adjacent patch. For a given patch, each control point along to a shared boundary is consistently generated using reconstruction data available to the patch. The reconstruction data is generated from values associated with a patch that owns the shared boundary. Because numerically identical data is used to evaluate each patch at each boundary, the boundaries are watertight. One advantage of the present invention is that watertight evaluation may be achieved using similar computational effort versus conventional non-watertight evaluation techniques.

20 Claims, 12 Drawing Sheets

METHOD FOR WATERTIGHT EVALUATION OF AN APPROXIMATE CATMULL-CLARK SURFACE

CROSS-REFERENCE TO RELATED APPLICATIONS

This application claims benefit of U.S. provisional patent application Ser. No. 61/250,832, filed on Oct. 21, 2009.

BACKGROUND OF THE INVENTION

1. Field of the Invention

The present invention generally relates to geometric processing in graphics systems and more specifically to a method for watertight evaluation of an approximate Catmull-Clark surface.

2. Description of the Related Art

Modern three-dimensional (3D) graphics systems are typically configured to generate one or more graphics images from one or more graphics scenes, with each graphics scene comprising one or more scene objects. The one or more graphics images are typically displayed or stored for display later. Each scene object is represented by a corresponding geometric model. Each geometric model may comprise a collection of abstract geometric objects such as triangles, patches, or meshes.

A subdivision surface is a type of geometric object described concisely by a coarse control mesh and a set of subdivision rules that specify how the control mesh may be refined into a more highly tessellated representation of a desired scene object. The control mesh may be recursively processed according to the subdivision rules to generate a limit surface that closely approximates a scene object or a portion of the scene object. The limit surface is typically represented as a set of abutting patches. In many applications, the limit surface needs to be constructed to enable a watertight tessellation, meaning a mesh of triangles that is tessellated from the limit surface to include no cracks, holes, or overlapping geometry. In a conventional graphics processing unit, each patch in the limit surface is tessellated into two or more triangles that represent a portion of the corresponding mesh of triangles. The mesh of triangles should be watertight because the mesh of triangles is typically used to render a corresponding scene object within an associated graphics image.

Catmull-Clark subdivision is a popular technique for achieving smooth-looking surfaces on scene objects comprising one or more subdivision surfaces. According to the Catmull-Clark subdivision technique, a well-known set of subdivision rules are applied recursively to a coarse control mesh to produce a progressively more detailed and smooth subdivision mesh. After an infinite number of subdivision steps, an initial surface specified by the control mesh converges to a "limit surface." A limited number of subdivision steps (i.e., non-infinite), however, produces a reasonable approximation of the limit surface. For the purpose of discussion herein, a "limit surface" refers to an approximate limit surface generated using a finite number of subdivision steps, and in particular an approximate Catmull-Clark surface.

A portion of the limit surface corresponding to a given patch is specified by control points for the patch. In order to form a watertight boundary between two abutting patches, the boundary must be parametrically continuous in position (C0). Since control points are specified and evaluated with finite precision (normally using 32-bit floating point values) independently for each patch, a boundary between two abutting patches may be computed slightly differently for each of the two abutting patches, resulting in visible holes in an associated scene object. Scenarios where logically identical vertices and control points are actually not bit-wise identical may result in non-C0 boundaries with holes between two patches. Such scenarios are common and may materially degrade image quality in rendered graphics images.

Accordingly, what is needed in the art is a technique for watertight approximation of limit surfaces for adjacent patches.

SUMMARY OF THE INVENTION

One embodiment of the present invention sets forth a method for evaluating a parametric patch that shares a boundary with at least one additional parametric patch. The method includes the steps of computing one or more control points associated with the parametric patch and parameters related to one or more adjacent control points associated with the at least one additional parametric patch, and transmitting the one or more control points and the parameters related to the one or more adjacent control points to a processing unit within a graphics processing pipeline, wherein the processing unit is configured to evaluate the parametric patch.

One advantage of the disclosed method is that it enables watertight Gregory patch evaluation to be performed with only a marginal increase of computational effort and storage requirements relative to conventional non-watertight evaluation. By contrast, conventional watertight evaluation techniques typically require many times the computational effort and storage requirements of conventional non-watertight evaluation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
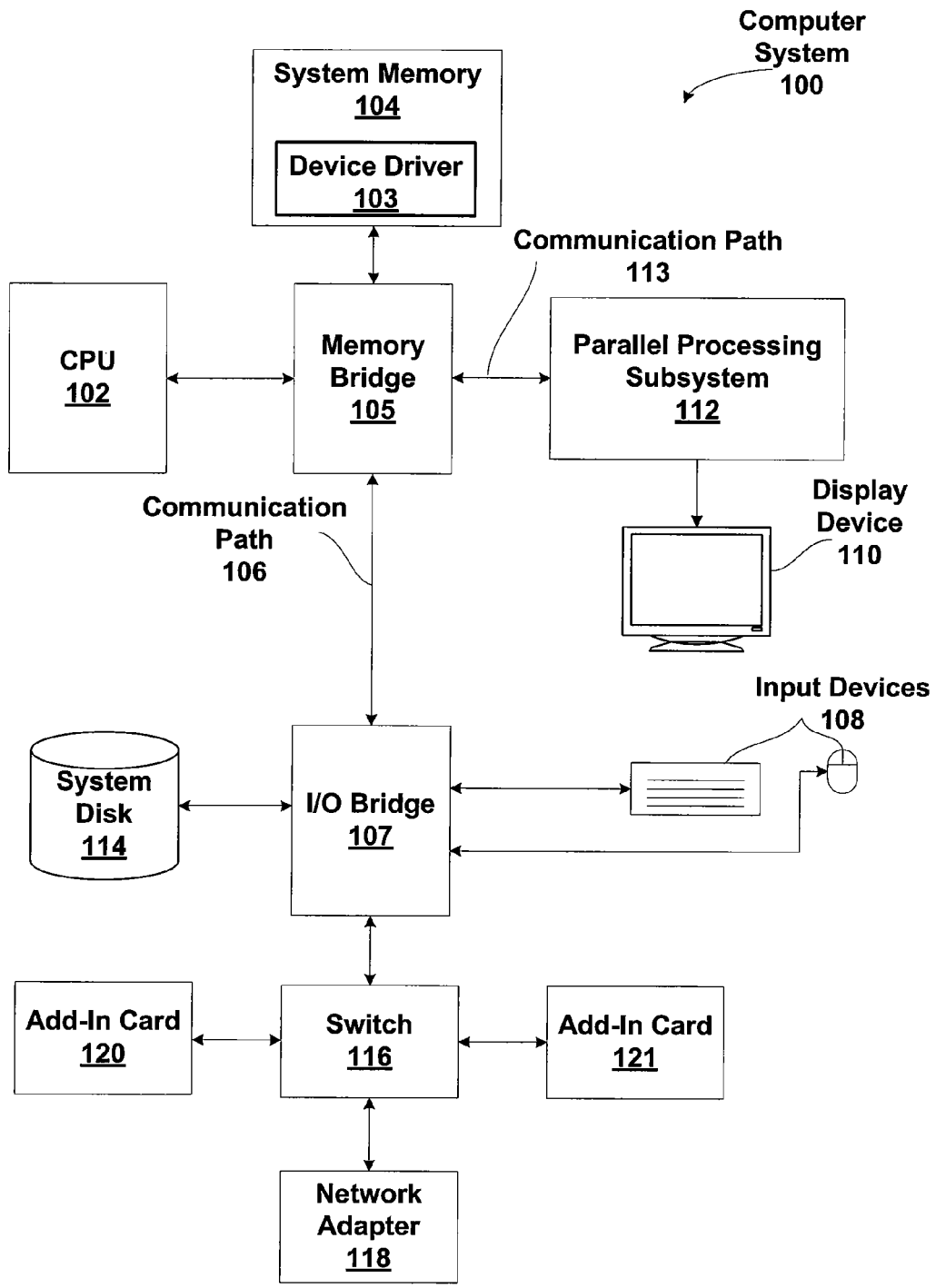
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
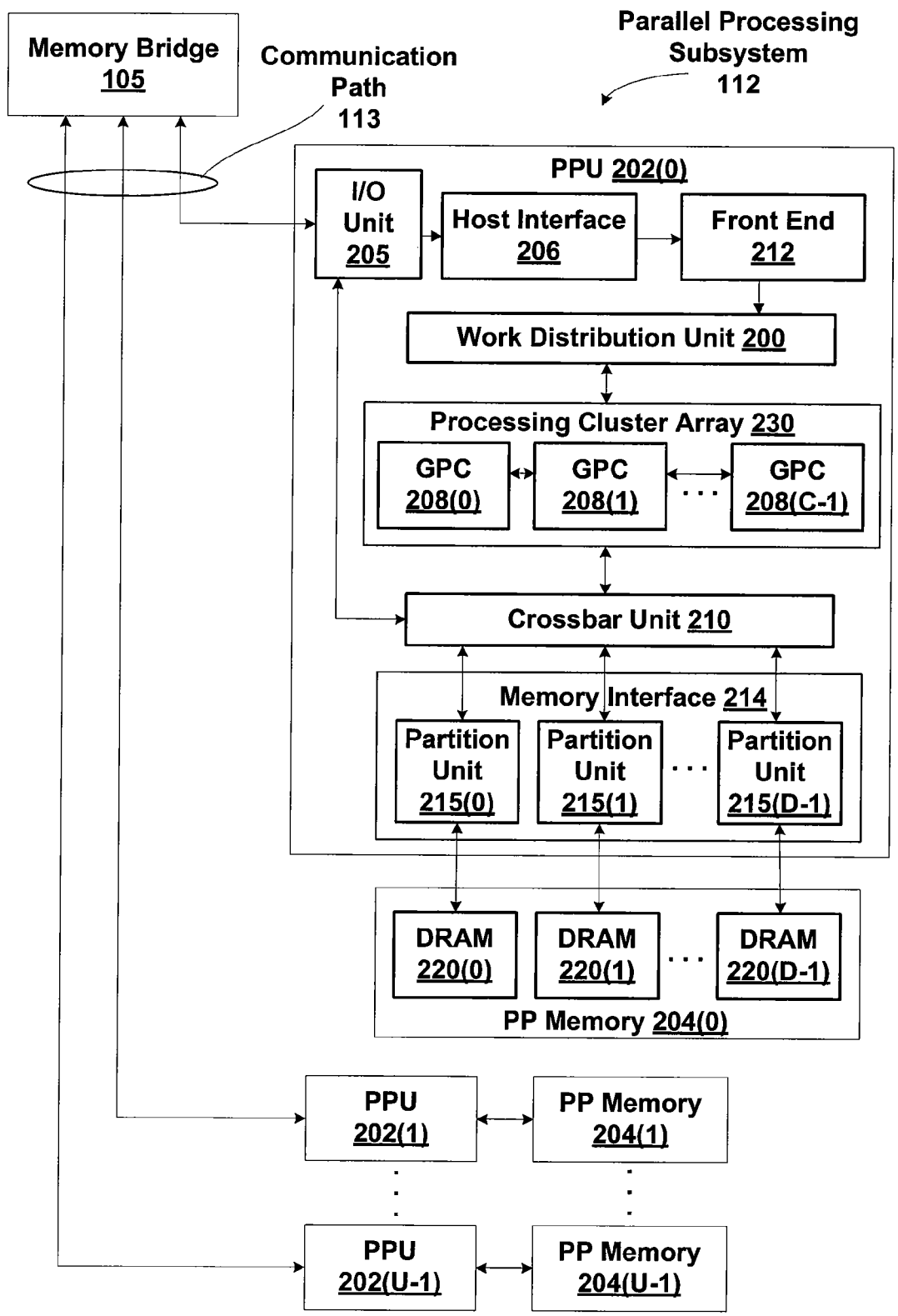
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
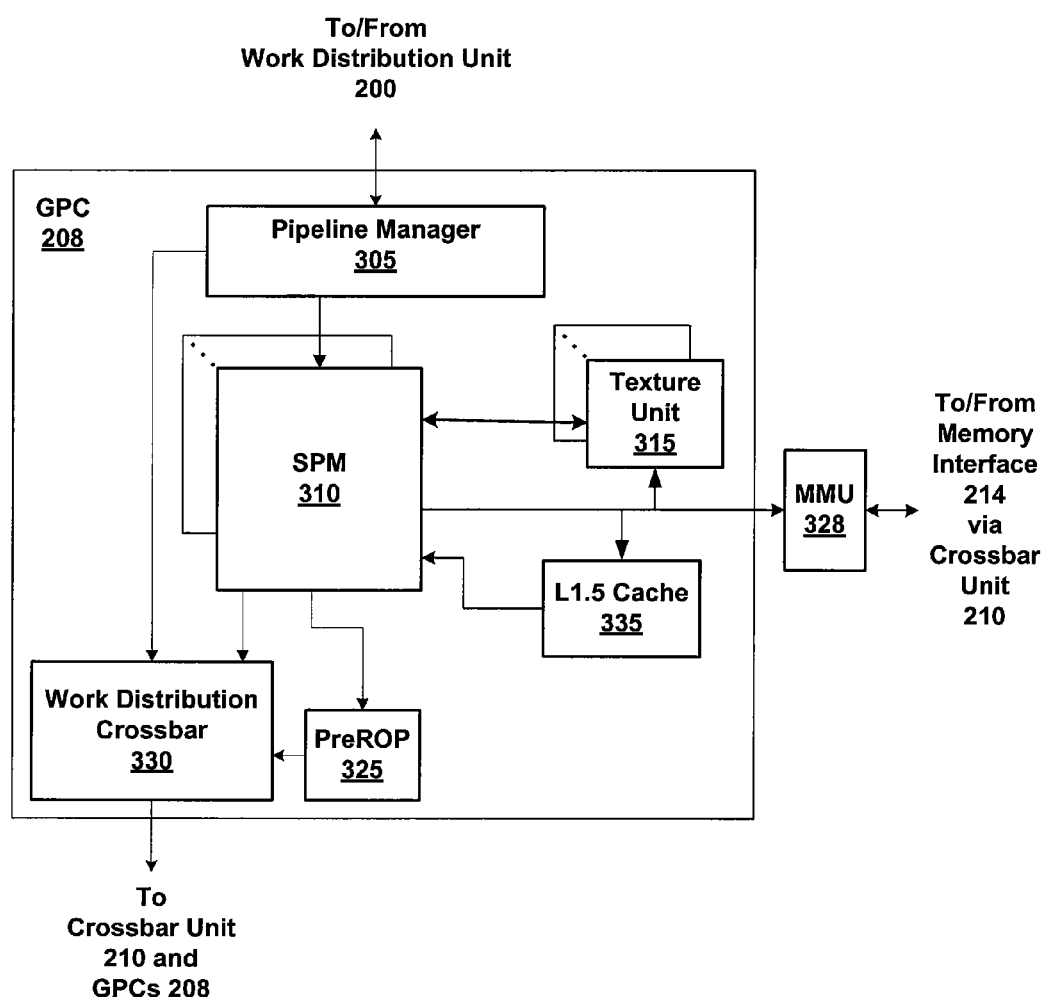
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
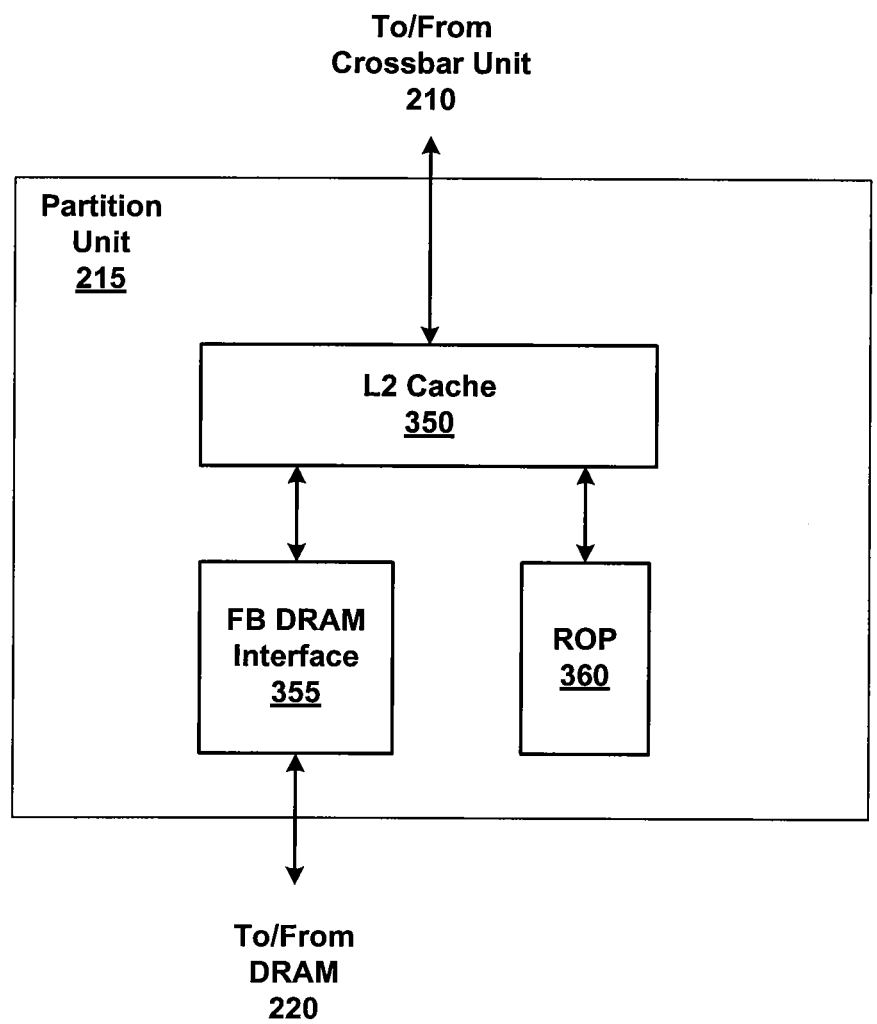
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
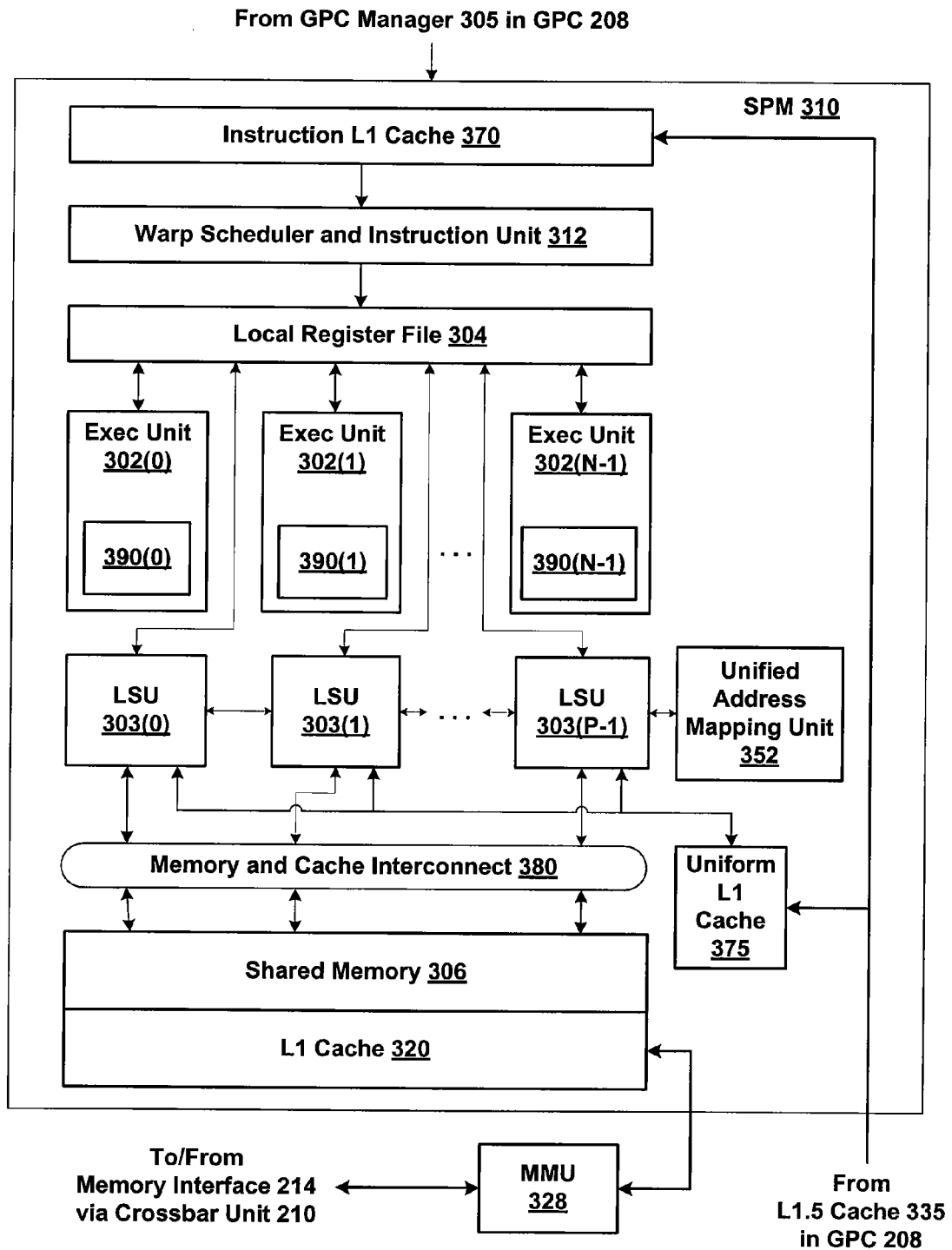
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Each parameter unit 390 within a corresponding execution unit 302, is configured to generate a fixed-point parameter. In one embodiment the fixed-point parameter represents a value from 0.0 to 1.0 with sixteen-bit resolution. The fixed-point parameters are generates to provide an integral number of divisions between 0.0 and 1.0. A given fixed-point parameter may be accessed by a shading program executing on a respective execution unit 302.

In other implementations, the parameter unit 390 may reside in other locations. For example, in one embodiment, a different parameter unit 390 may reside within each GPC 208 separate and distinct from the SPM 310.

Graphics Pipeline Architecture

Figure 4:
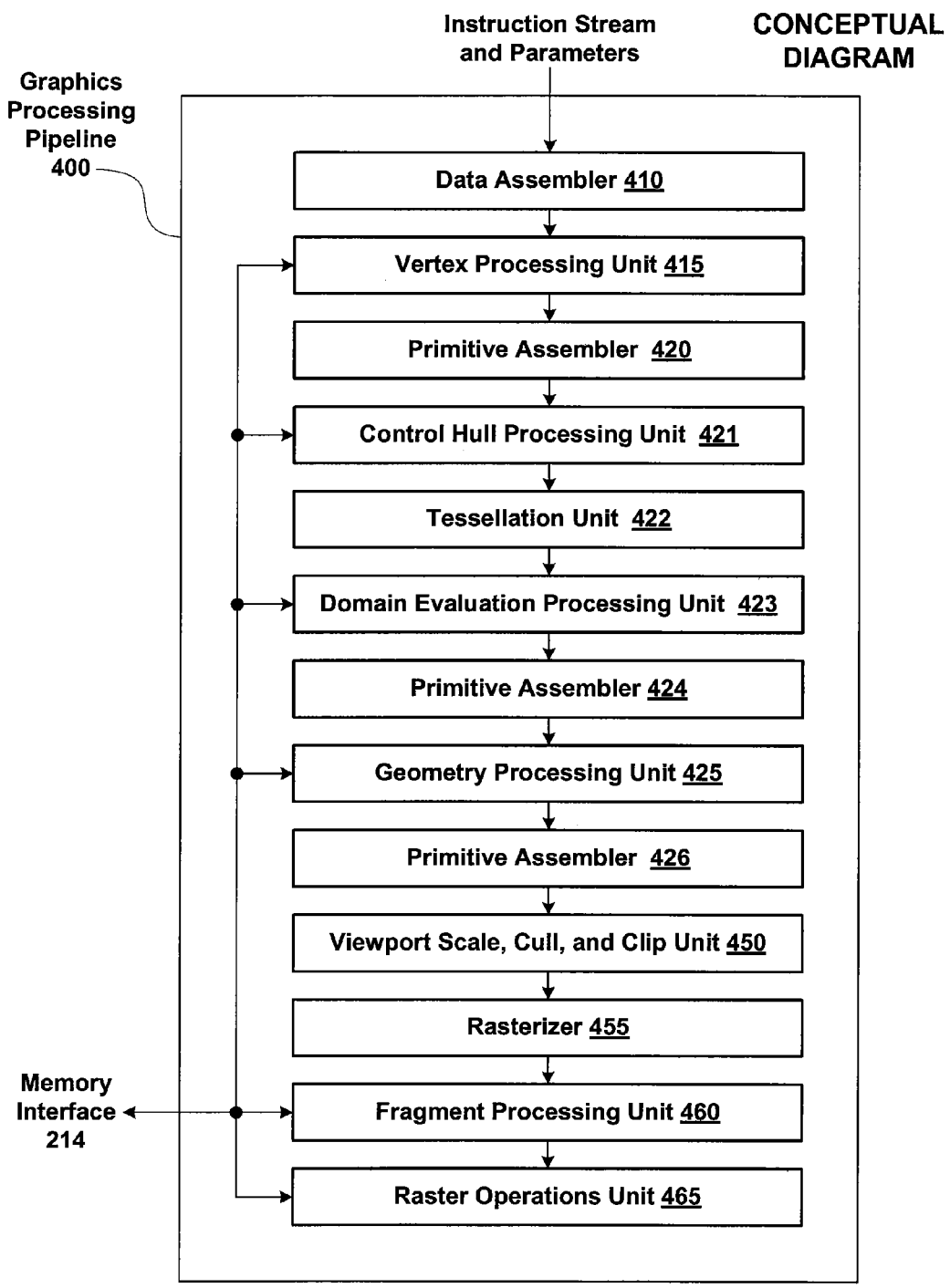
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by control hull processing unit 421. Graphics primitives include triangles, line segments, points, and the like.

The control hull processing unit 421 transforms control points for a geometric patch from a basis representation to an application representation for tessellation. The control hull processing unit 421 also computes tessellation factors for edges of geometric patches. A tessellation factor applies to a single edge and quantifies a view-dependent level of detail associated with the edge. A tessellation unit 422 is configured to receive the tessellation factors for edges of a patch and to tessellate the patch into multiple geometric primitives such as triangle or quad primitives, which are transmitted to a domain evaluation processing unit 423. The domain evaluation processing unit 423 operates on parameterized coordinates for a geometric primitive to generate a surface representation and vertex attributes for each vertex associated with the geometric primitive.

Primitive assembler 424 receives vertex attributes from domain evaluation processing unit 423, reading stored vertex attributes, as needed, and constructs graphics primitived for processing by geometry processing unit 425. Geometry processing unit 425 is a programmable execution unit that is configured to execute geometry shader programs, transforming graphics primitives received from primitive assembler 424 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to primitive assembler 426, which receives the parameters and vertices from the geometry processing unit 425, reading stored vertex attributes, as needed, and constructs graphics primitives for processing by a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Watertight Evaluation of Approximate Catmull-Clark Surface

The present invention sets forth three related principles. The first principle is that of boundary ownership. The second principle improves computational efficiency by reconstructing rather than redundantly computing neighboring control points for evaluation. The third principle defines an efficient technique for evaluating a Gregory patch through a reformulation of a conventional Gregory patch formula, defined below in Equation 1.

Watertight evaluation of approximate Catmull-Clark subdivision surfaces is achieved by introducing boundary ownership to each boundary of abutting patches. Two patches may share a common boundary, and many patches may share a common corner. The concept of ownership, as defined herein, dictates that each boundary is associated with a specific patch that "owns" the boundary and all associated control points computed for the boundary. In other words, boundary ownership extends to ownership of each control point along a given owned boundary. Furthermore, each control point that is logically identical to a computed control point owned by a different patch comprises a bit-wise identical copy of the computed control point. In this way, consistent computation may be performed with respect to each boundary for each patch, without introducing numerical errors and without generating holes in related rendered scene objects. This concept is described in detail in FIGS. 5 through 10, below. A technique for effectively computing the bit-wise identical control points is also presented to facilitate efficient implementations on the PPU 202 described in FIGS. 2 through 4.

Figure 5:
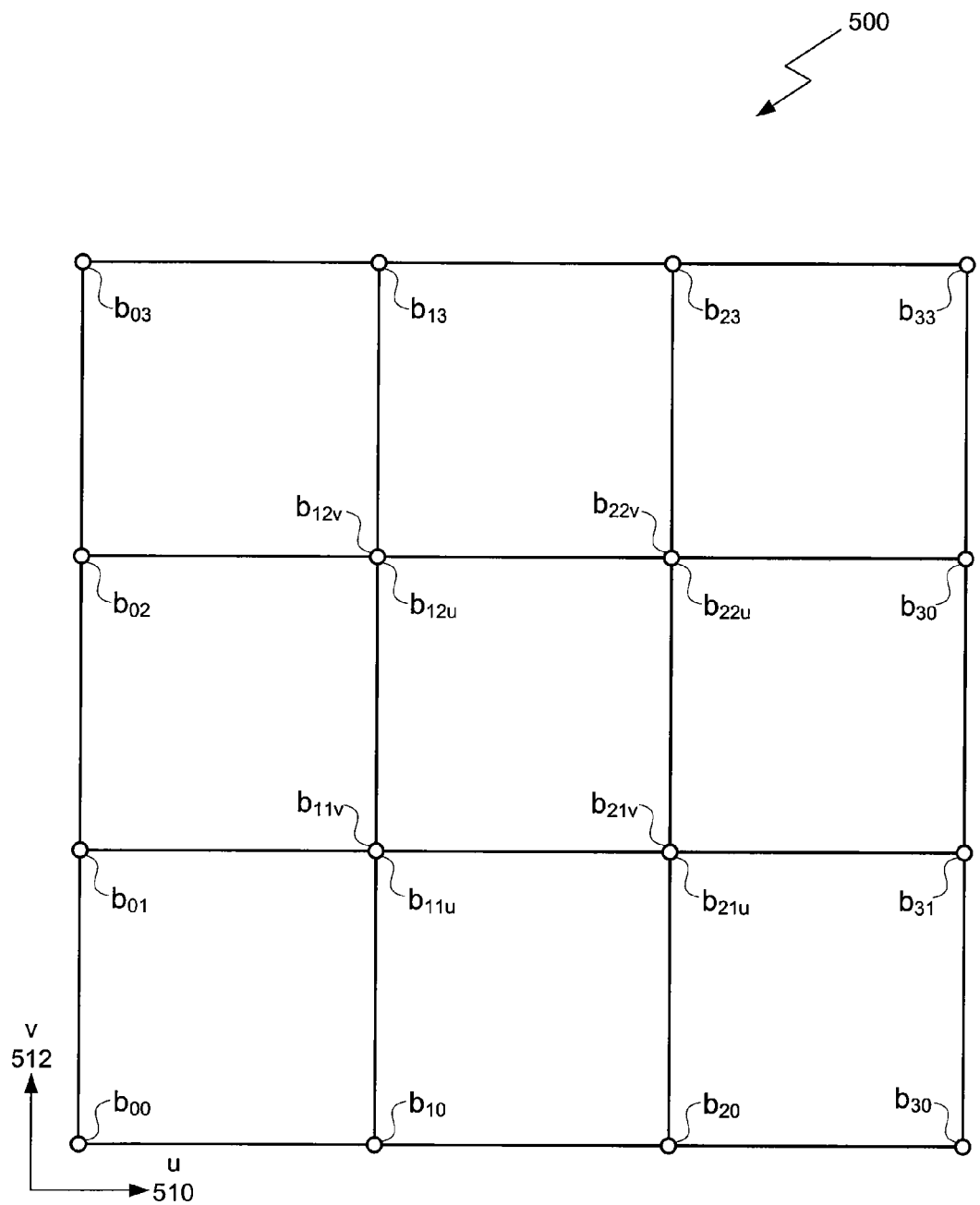
FIG. 5 illustrates a Gregory patch and corresponding control points, according to one embodiment of the present invention.

FIG. 5 illustrates a Gregory patch 500 and corresponding control points $b_{00}$ through $b_{33}$, according to one embodiment of the present invention. As shown, the Gregory patch 500 includes twenty control points $b_{00}$ through $b_{33}$. The twenty control points are disposed in a grid in parametric space defined by parameter u 510 and parameter v 512. Control points $b_{11u}$, $b_{21u}$, $b_{22u}$, and $b_{12u}$ are associated with edges defined by varying parameter u 510, and control points $b_{11v}$, $b_{21v}$, $b_{22v}$, and $b_{12v}$ are associated with edges defined by varying parameter v 512. The position and labeling of each control point $b_{00}$ through $b_{33}$ represents a conventional labeling of indices for control points within a Gregory patch.

The Gregory patch 500 may be evaluated using Equation 1, below. Persons skilled in the art will recognize that P(u,v) represents a three-dimensional (3D) surface defined as a parametric surface P in u and v. Furthermore, the twenty control points $b_{00}$ through $b_{33}$ may be computed from a subdivision surface control mesh or a subdivided mesh computed previously from the control mesh. Any technically feasible technique may be used to compute each subdivided mesh.

$$P(u,v) = U3 \cdot \begin{bmatrix} b_{00} & b_{01} & b_{02} & b_{03} \\ b_{10} & \frac{vb_{11u} + ub_{11v}}{u+v} & \frac{(1-v)b_{12u} + ub_{12v}}{1+u-v} & b_{13} \\ b_{20} & \frac{vb_{21u} + (1-u)b_{21v}}{1-u+v} & \frac{(1-v)vb_{22u} + (1-u)b_{22v}}{2-u-v} & b_{23} \\ b_{30} & b_{31} & b_{32} & b_{33} \end{bmatrix} \cdot V3^T \quad \text{(Equation 1)}$$

In Equation 1, U3 and V3 are defined as vectors, given below in Equations 2 and 3, respectively:

$$U3 = [(1-u)^3 \; 3(1-u)^2 u \; 3(1-u)u^2 \; u^3] \quad \text{(Equation 2)}$$

$$V3 = [(1-v)^3 \; 3(1-v)^2 v \; 3(1-v)v^2 \; v^3] \quad \text{(Equation 3)}$$

Figure 6:
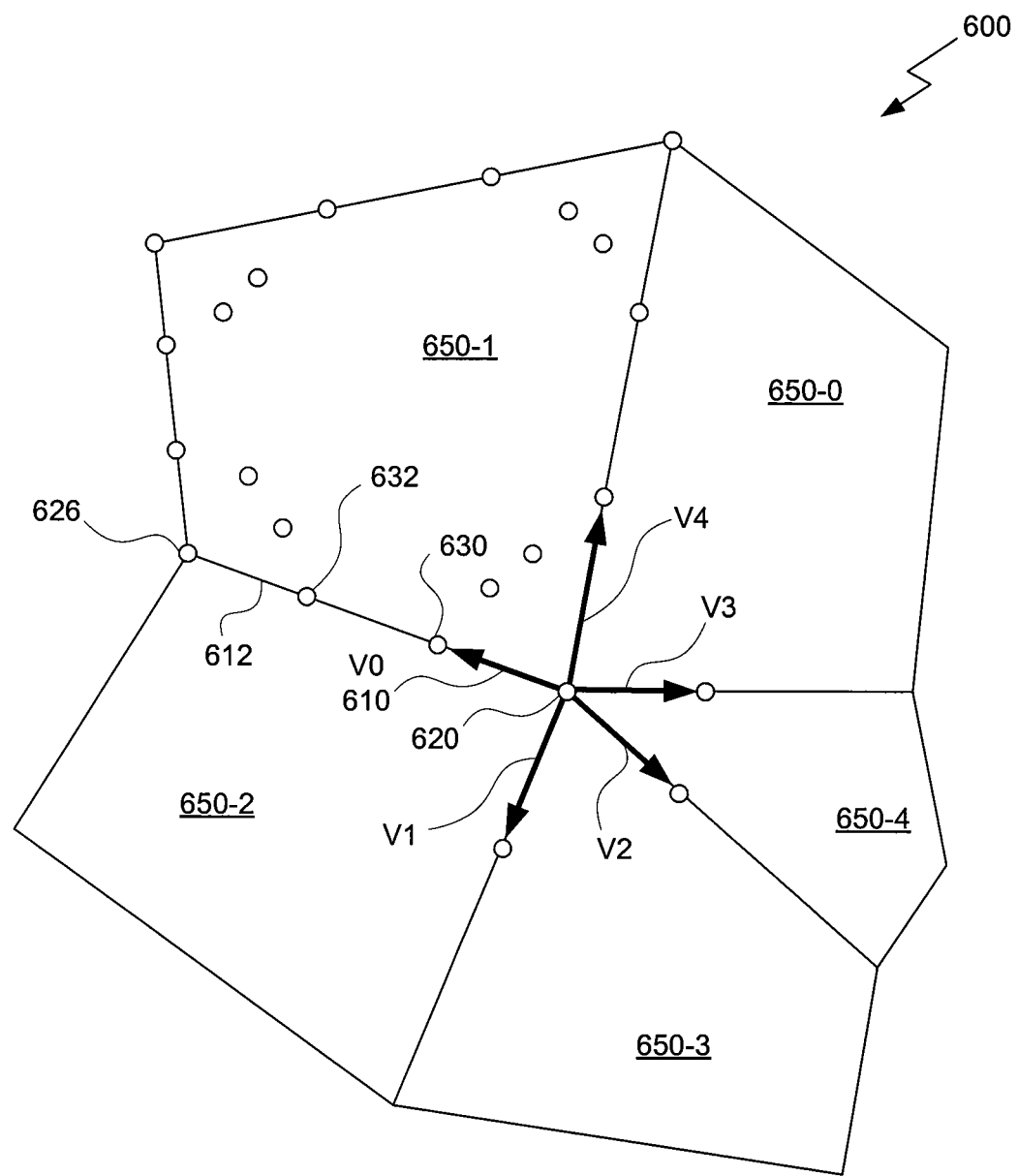
FIG. 6 illustrates a mesh comprising five different Gregory patches with a shared vertex, according to one embodiment of the present invention.

FIG. 6 illustrates a mesh 600 comprising five different Gregory patches 650 with a shared vertex 620, according to one embodiment of the present invention. Each boundary is defined by two corner control points and two edge control points. For example, Gregory patch 650-1 has a shared boundary 612 with Gregory patch 650-2, where position along the shared boundary 612 is defined by four control points, including a control point associated with shared vertex 620, and control points 626, 630, and 632. A tangent line V0 610 that follows the shared boundary 612 is also defined by the four control points. Persons skilled in the art will recognize, however, that cross boundary tangents also require two interior points closest to the boundary and two closest edge points adjacent to the boundary. Each other tangent vector V1 through V4 is also defined by four corresponding control points each.

Figure 7:
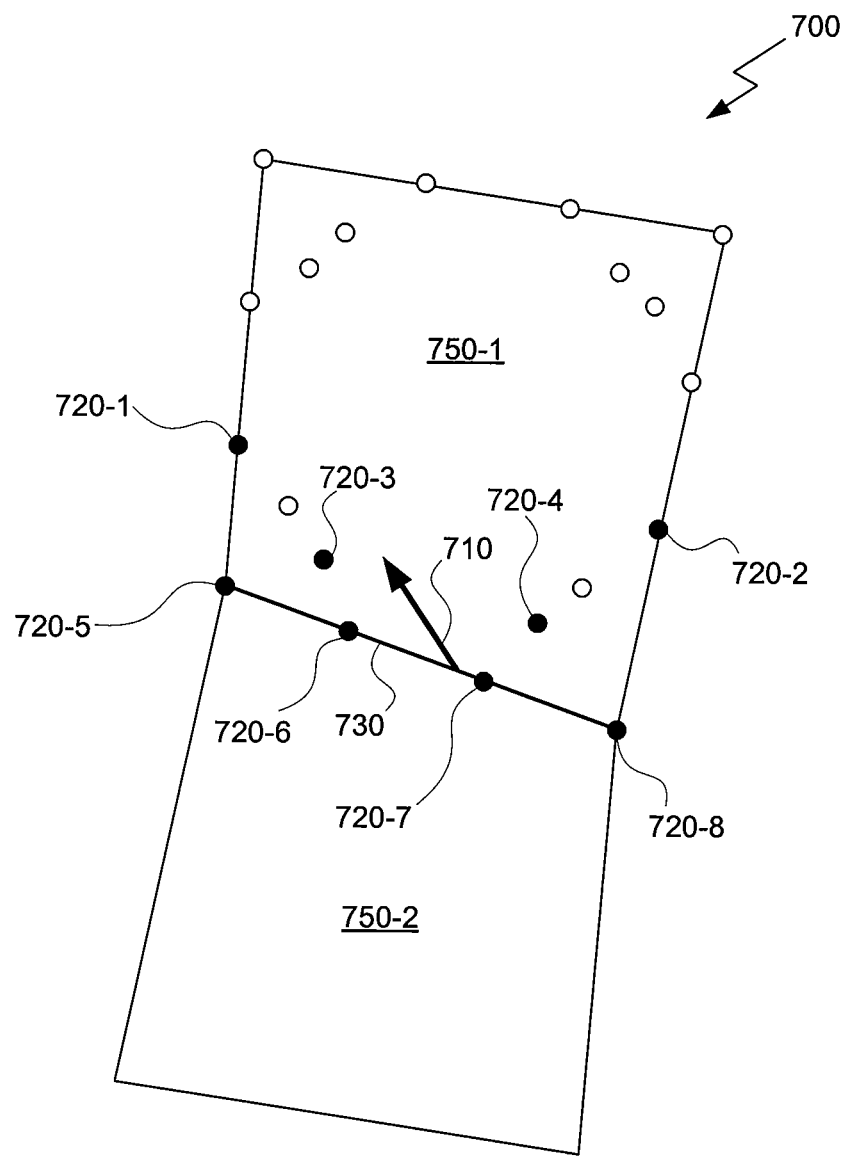
FIG. 7 illustrates a cross boundary tangents and related control points, according to one embodiment of the resent invention.

FIG. 7 illustrates a cross boundary tangent 710 and related control points 720, according to one embodiment of the resent invention. As shown, control points 720 include four control points 720-5 through 720-8 along edge 730, two closest edge control points 720-1 and 720-2, and two interior control points 720-3 and 720-4 associated with the boundary 730.

At each stage of subdivision of a mesh 700, each boundary, such as boundary 730, is assigned to one patch for the purpose of ownership. Each abutting patch then reconstructs related control points for evaluation, as described in greater detail below. In one scenario, patch 750-2 owns the boundary 730 and related control points 720-5 through 720-8. To evaluate patch 750-1, control points 720-5 through 720-8 are reconstructed to generate a bit-wise identical representations thereof. Any technically feasible technique may be used to assign ownership. Any technically feasible technique may be used to represent ownership for each patch in a mesh of patches, such as an attribute associated with each patch.

Figure 8:
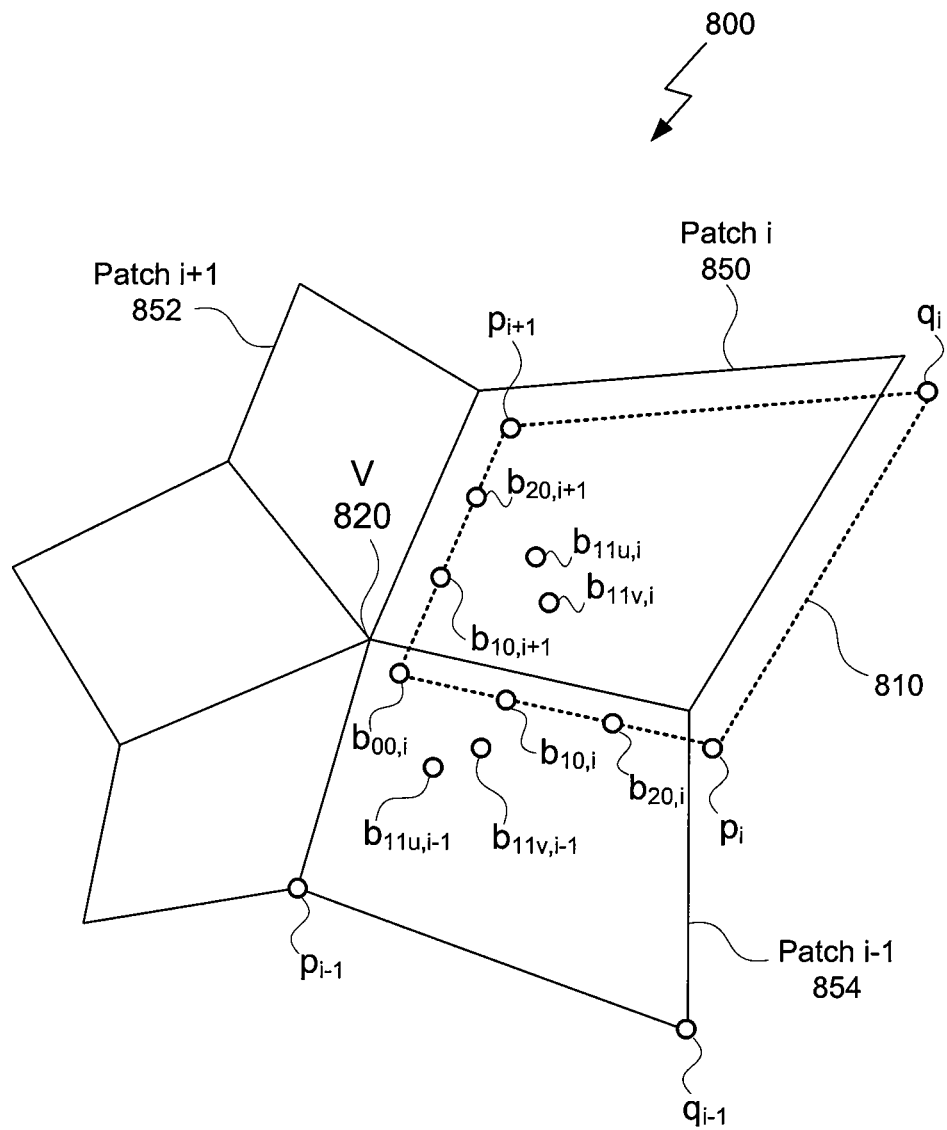
FIG. 8 illustrates notation for control point indices for a patch within a mesh, according to one embodiment of the present invention.

FIG. 8 illustrates notation for control point indices for a patch 810 within a mesh 800, according to one embodiment of the present invention. Control point indices may be labeled with respect to position within a given patch and ownership by an owner patch, as indicated by a patch identification number. For example, control point $b_{00,i}$ is a control point for a lower left corner (u=0,v=0) of patch "i 850," according to labeling conventions illustrated previously in FIG. 5. Furthermore, control point $b_{00,1}$ is owned by patch "i 850." However, patch $b_{20,I+1}$ is owned by patch "i+1 852."

A direct evaluation of two patches ("A" and "B") without boundary ownership may be represented with a sequence of operations defined in pseudo-code specified in Table 1, below.

TABLE 1

```
void ComputeLimitA(in vector2 uv, out vector3 pos, out vector3 tan, out vector3 bitan)
{
    evalGregory(cp[A][0], cp[A][1], ..., cp[A][19], uv, pos, tan, bitan);
}
void ComputeLimitB(in vector2 uv, out vector3 pos, out vector3 tan, out vector3 bitan)
{
    evalGregory(cp[B][0], cp[B][1], ..., cp[B][19], uv, pos, tan, bitan);
}
```

The function evalGregory( ) function implements Gregory patch evaluation, "uv" is a parametric position of the point to be evaluated, and "cp[i][j]" is array comprising 20 control points per patch. Each patch is identified with index "i," and each control point is identified with index "j." For example cp[A][0] refers to control point "0" (zero) of patch "A."

To apply boundary ownership, either patch A or patch B owns control points along a shared boundary between patches A and B. For example, if patch A owns the shared boundary, then ComputeLImitB should use certain control points owned by patch A to evaluate patch B. The ComputeLimit( ) functions for evaluating the partches A, B should follow a sequence of operations defined in pseudo-code specified in Table 2, below.

TABLE 2

```
void ComputeLimitA(in vector2 uv, out vector3 pos, out vector3 tan, out vector3 bitan)
{
    evalGregory(cp[A][0], cp[A][1], ..., cp[A][19], uv, pos, tan, bitan);
}
void ComputeLimitB(in vector2 uv, out vector3 pos, out vector3 tan, out vector3 bitan)
{
    If (uv belongs to the boundary between A and B)
    {
        float2 uv_a = evaluate_uv_for_patch_a(uv);
        evalGregory(cp[A][0], cp[A][1], ..., cp[A][19], uv_a, pos, tan, bitan);
    }
    else
    {
```

TABLE 2-continued

```
        evalGregory(cp[B][0], cp[B][1], ..., cp[B][19], uv, pos, tan, bitan);
    }
}
```

With the sequence of operations illustrated in Table 2, boundary vertices in both patches will use the same input data (cp[A][ . . . ], uv), so they should generate the same output data. One important problem with implementing the evaluation technique illustrated above in Table 2 is that computational flow within a conventional graphics processing pipeline, such as graphics processing pipeline 400 of FIG. 4 is that each patch (A, B and others) is evaluated separately from each other patch, without a shared inter-patch context. In other words, when patch B is being evaluated within the domain evaluation processing unit 423, the domain evaluation processing unit 423 conventionally does not have access to control points for patch A. This restriction on available context is common in popular graphics computation environments, such as the well known "DX11" environment defined by Microsoft™.

As is well known, patch evaluation is conventionally performed in the domain evaluation processing unit 423 and control points for each patch are computed in the control hull processing unit 421, upstream from the domain evaluation processing unit 423.

For patch B, the domain evaluation processing unit 423 can only access output data from the control hull processing unit 421 that is associated with patch B. One naïve solution to the problem of sharing boundary control point context would be to let the control hull processing unit 421 compute control points for patch B, and for all four directly adjacent patches. This solution would be extremely expensive because the control hull processing unit 421 would have to compute many more control points than in conventional non-water tight scenarios. Furthermore, transmitting control point data from the control hull processing unit 421 to the domain evaluation processing unit 423 for four additional patches beyond one patch being evaluated would be prohibitively expensive in terms of internal bandwidth for the PPU 202.

In one embodiment of the present invention, the control hull processing unit 421, which does have contextual visibility to each patch in a mesh, computes twenty points for a given patch, but also computes additional data that allows the domain evaluation processing unit 423 to recover exact numeric values for control points of adjacent patches using relatively low computational effort within the domain evaluation processing unit 423. In total, the present invention enables water tight evaluation with only marginal differences in computational and bandwidth costs relative to conventional non-water tight techniques.

Control points owned by an adjacent patch may be computed in the context of a given patch using two different "recovery" methods that each process the additional data computed in the control hull processing unit 421 for the patch. The first method relates to recovering interior control points for an adjacent patch. The second method relates to recovering edge control points for an adjacent patch.

Interior control points may be evaluated using Equations 4 through 9, below. In Equation 4, $$c_v = \cos\left(\frac{\pi}{nv}\right),$$

where nv is a "valance" for vertex V, such as vertex V 820 of FIG. 8. In Equation 5, $$c_i = \cos\left(\frac{\pi}{ni}\right),$$

where ni is a valence for vertex $P_i$.

$$x_i = \frac{c_i}{3}b_{00} + \frac{3 - 2c_v - c_i}{3}b_{10,i} + \frac{2c_v}{3}b_{20,i} \quad \text{(Equation 4)}$$

$$y_i = \frac{1}{18}(2(p_{i+1} - p_{i-1}) + q_i - q_{i-1}) \quad \text{(Equation 5)}$$

With $x_i$ and $y_i$, interior control points may be computed using Equations 6 and 7, below.

$$b_{11u,i} = x_{i+1} - y_{i+1} \quad \text{(Equation 6)}$$

$$b_{11v,i} = x_i + y_i \quad \text{(Equation 7)}$$

Importantly, an internal control point for a Gregory patch that are opposite across an edge have identical x components and y components that differ only by sign. This is illustrated in Equations 8 and 9, below.

$$b_{11v,i} = x_i + y_i \quad \text{(Equation 8)}$$

$$b_{11v,i-1} = x_i - y_i \quad \text{(Equation 9)}$$

Because of this relationship, the control hull processing unit 421 need only compute a y component for each related control point for given patch. The domain evaluation processing unit 423 can then recover a y component of the adjacent patch control point by simply changing a sign for a corresponding internal control point. Recovering an x component for each corresponding internal control point is based on an observation that $x_i$ is a weighted sum of corner and edge control points $b_{00}$, $b_{10,i}$ and $b_{20,i}$. As such, weights of $c_i/3$, $(3-2c_v-c_i)/3$, $2c_v/3$ and may be added to corresponding elements in the weighted sum instead. Using a texture lookup technique to generate these weights no additional computational load is added to the domain evaluation processing unit 423. The texture lookup technique is described in greater detail below.

Pseudo code in Table 3 illustrates a procedure for recovering internal control points for a neighboring patch based on boundary ownership.

TABLE 3

```
// bOwnsBoundary[k] is true if current patch owns edge k
void DS(in float2 uv, out float3 tan, in bool bOwnsBoundary[4])
{
  tan = 0;
  bool bNotOwner[4];
  bNotOwner[0] = (uv.x == 0) && !bOwnsBoundary[0];
  bNotOwner[1] = (uv.x == 1) && !bOwnsBoundary[1];
  bNotOwner[2] = (uv.y == 0) && !bOwnsBoundary[2];
  bNotOwner[3] = (uv.y == 1) && !bOwnsBoundary[3];
  // 20 is 5*4. we go over 20 control points in two nested loops
  // first one has 5 iterations, second one - 4. points are grouped
  // in such a way that each of 4 points enumerated in inner
  // loop is associated with different patch corner
  for (int k = 0; k < 5; ++k)
  {
    // bilinearly fetch weights for 4 control points from texture array:
    float4 w = weights.Sample(uv[0],uv[1],k);
    for (int j = 0; j < 4; ++j)
    {
      float3 cp = control_points[k*4+j]; // control point
      // if is a "no-op" if the loops are manually unrolled
      if (this is interior control point)
      {
        if (bNotOwner[j])
          cp = -cp; // obtain point of adjacent patch
      }
      tan += w[j] * cp; // accumulate the result
    }
  }
}
```

The array "bOwnsBoundary" specifies boundary ownership and may be used when computing a particular patch whether the patch owns a given boundary. Values for bOwnsBoundary may be precomputed by an application executing on CPU 102 of FIG. 1. In general, any technically feasible technique may be used to specify boundary ownership. In one embodiment, bOwnsBoundary is an array of flags that specify boundary ownership relative to a given patch. Data comprising bOwnsBoundary may be stored using any technically feasible technique. For example data comprising bOwnsBoundary may be stored as a texture, accessible to the domain evaluation processing unit 423. As shown, internal control points for adjacent patches may be performed using minimal additional computation.

In one embodiment, recovering edge control points for adjacent patches is performed using control point $b_{10,j}$ illustrated in FIG. 8, and an additional parameter $w_{00}$, described in greater detail below. Equation 10 is derived from Equation 1. Equation 10 illustrates evaluation of control point $13_{10,j}$, from control point $b_{00}$, a parameter $\alpha$, a parameter $\beta$, and points $p_j$ and $q_j$.

$$b_{10,i} = b_{00} + \sum_{j=0}^{n}\left(\alpha\cos\left(\frac{2\pi(j-i)}{n}\right)p_j + \beta\cos\left(\frac{2\pi(j-i)+\pi}{n}\right)q_j\right) \quad \text{(Equation 10)}$$

Parameters $\alpha$ and $\beta$ computed using Equation 11 and 12, respectively, as given below.

$$\alpha = \frac{1}{3n} + \frac{\cos\left(\frac{\pi}{n}\right)}{3n\sqrt{4 + \cos^2\left(\frac{\pi}{n}\right)}} \quad \text{(Equation 11)}$$

-continued $$\beta = \frac{1}{3n\sqrt{4 + \cos^2\left(\frac{\pi}{n}\right)}}$$ (Equation 12)

Referring again to FIG. 8, control points $b_{10,i}$ and $b_{10,i+1}$ are computed for patch i 850. Similarly, control points with indices $b_{10,i+1}$ and $b_{10,i+2}$ would be computed for patch i+1 852, and so forth around vertex V 820.

The additional parameter $w_{00}$ is computed using Equation 13, below.

$$w_{00} = \sum_{j=0}^{n} \left( \alpha \cdot p_j \cdot \cos\left(\frac{2\pi \cdot (j)}{n}\right) + \beta \cdot q_j \cdot \cos\left(\frac{2\pi \cdot (j) + \pi}{n}\right) \right)$$ (Equation 13)

Adjacent edge control points may be computed from $b_{10,0}$ (i=0) and $w_0$, as illustrated below in Equation 14 for $b_{10,1}$.

$$b_{10,i} = b_{00,0} + (b_{10,0} - b_{00,0}) \cdot \sin\left(\frac{2\pi \cdot (i)}{n}\right) + w_0 \cos\left(\frac{2\pi \cdot (i)}{n}\right)$$ (Equation 14)

Persons skilled in the art will recognize that the principles illustrated in Equation 14 may be used to reconstruct edge control points for adjacent patches or edge control points for a current patch.

To further reduce computational load, $b_{10,i}$ need not be computed as originally formulated from Equation 1. Instead, the control hull processing unit 421 computes a difference $\overline{b_{10,0}} = (b_{10,0} - b_{00,0})$ instead of just computing $b_{10,0}$, and the domain evaluation processing unit 423 computes $\overline{b_{10,i}} = (b_{10,i} - b_{00,0})$. Equation 15 represents an efficient reformulation of Equation 14 for computing $\overline{b_{10,i}}$.

$$\overline{b_{10,i}} = \overline{b_{10,0}} \cdot \cos\left(\frac{2\pi \cdot (i)}{n}\right) + w_{00} \sin\left(\frac{2\pi \cdot (i)}{n}\right)$$ (Equation 15)

Since only a discrete and limited set of angles are presented to the COS( ) and SIN( ) functions, these functions may be pre-computed and stored in a constant buffer for efficient evaluation.

Equation 16 sets forth a reformulation of Equation 1, which shifts arithmetic computation effort into a lookup from one or more pre-computed coefficient tables $W_{i,j}(u,v)$. The reformulation is based on the underlying objective of Equation 1, which is to perform a set of weighted summation operations on input terms. As shown, this underlying objective is directly computed using Equation 16. One aspect of reformulating Equation1 into Equation 16 a use of piece-wise linear approximation of the corresponding weights in the weighted sum operation.

$$P(u,v) = \Sigma W_{i,j}(u,v) b_{i,j[u,v]}$$ (Equation 16)

Equation 16 may be evaluated within the domain evaluation processing unit 423 for position using six scalar registers, including three for accumulating a weighted sum for each dimension in 3D Cartesian space, and three additional scalar registers for temporary storage of $b_{i,j[u,v]}$ when a lookup is performed to $W_{i,j}(u,v)$. A fused multiply-add (FMA) operation should be used to accumulate each weighted sum. Two tangent vectors (tangent and bitangent), each requiring three scalar registers, are also accumulated for computing a normal vector via a cross-product operation. Six additional scalar registers are used for accumulating the tangents, for a total of twelve scalar registers within the domain evaluation processing unit 423.

Weights for the weighted sum operation are represented as $W_{i,j}(u,v)$ and stored within a texture map. Values are read using bi-linear sampling operation, which naturally generates appropriate samples for a piecewise linear approximation of discrete samples in two dimensions. In one embodiment, a sixteen bit floating point representation is used within the texture map, allowing four samples to be efficiently fetched simultaneously using a single fetch operation. In one embodiment, a maximum subdivision for a patch within a control mesh is 64×, and a 64×64 texture suffices as a repository of values for $W_{i,j}(u,v)$.

When computing weighted sums for twenty control points that specify a Gregory patch, 3 sums are evaluated with 20 elements each. Each element is accompanied with scalar weight. In total 60 scalar weights are needed. However, since each weight is fetched from the same (u,v) position, we can use 4-element textures instead of scalar textures and fetch 4 weights at once. Of the 16 rgba16 fetches, 15 are needed for the shader when computing position, tangent, and bi-tangent. Four scalar registers are be needed for storing results of each fetch, thus increasing a count of required scalar registers to 16.

Figure 9:
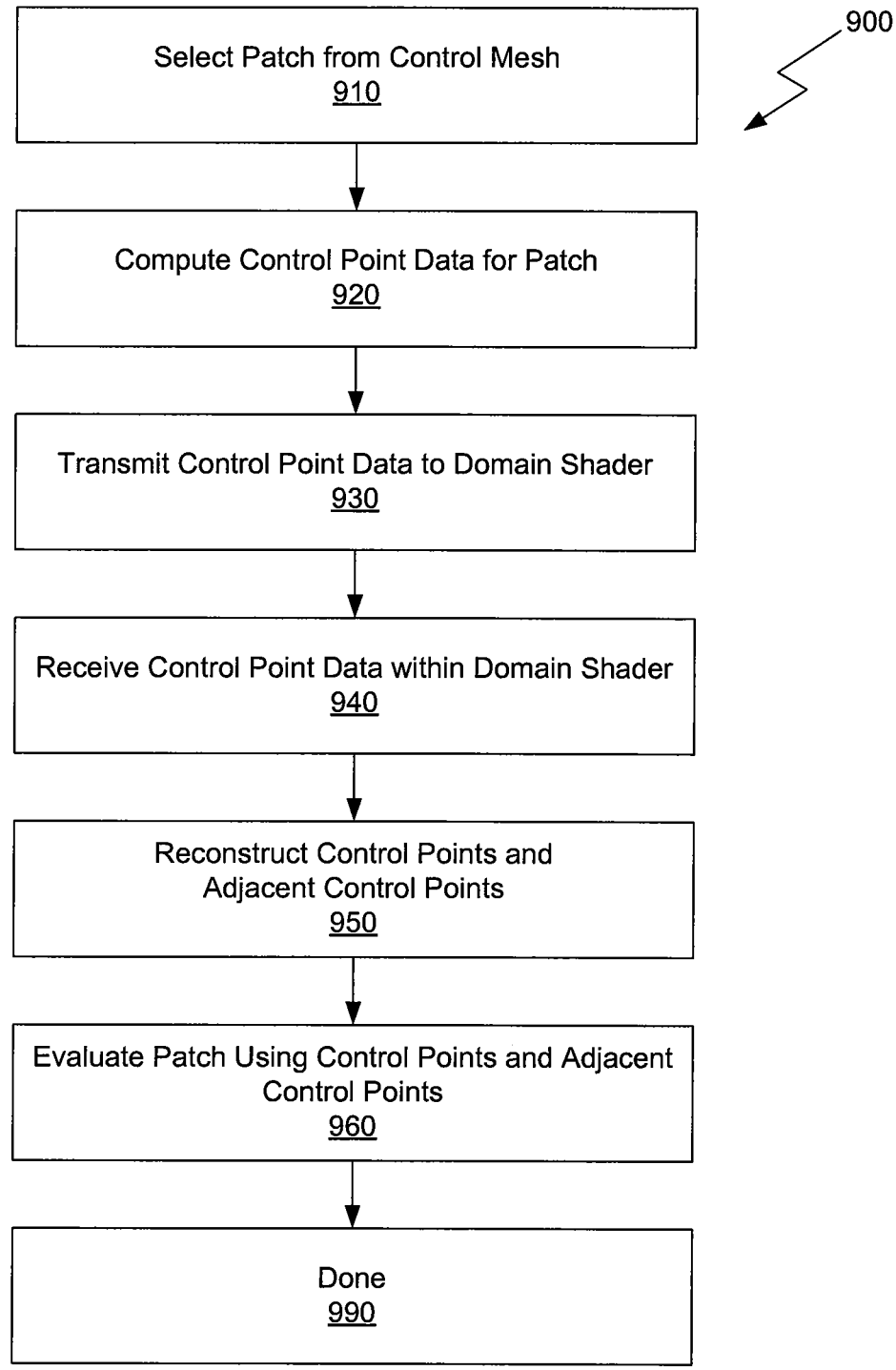
FIG. 9 is a flow diagram of method steps for performing watertight evaluation of a Gregory patch, according to one embodiment of the present invention.

FIG. 9 is a flow diagram of method steps 900 for performing watertight evaluation of a Gregory patch, according to one embodiment of the present invention. Although the method steps are described in conjunction with the systems of FIGS. 1, 2, 3A, 3B, 3C, and 4 persons skilled in the art will understand that any system configured to perform the method steps, in any order, is within the scope of the inventions.

The method begins in step 910, where the control hull processing unit 421 of FIG. 4 selects a patch from a subdivision surface control mesh. Ownership of each edge of the patch is determined according to any technically feasible technique and attributed to each edge of the patch as edge ownership information. In one embodiment, the edge ownership information comprises an ownership flag for each edge for the patch, as illustrated above in Table 3. In step 920, the control hull processing unit 421 computes control point data for the selected patch according to any technically feasible technique, and according to Equations 4 through 9, and Equations 10 through 15. In step 930, the control hull processing unit 421 transmits the control point data to the domain evaluation processing unit 423. In step 940, the domain evaluation processing unit 423 receives the control point data. The data may be transmitted using any technically feasible technique, such as any transmission technique consistent with data flow through the graphics processing pipeline 400.

In step 950, the domain evaluation processing unit 423 generates certain control points and generates reconstructed adjacent control points from the transmitted control point data and edge ownership information, according to Equations 4 through 9 and Equations 14 and 15. In step 960, the domain evaluation processing unit 423 evaluates the selected patch based on generated control points and reconstructed adjacent control points. In one embodiment, the domain evaluation processing unit 423 evaluates individual three-dimensional points from the selected patch according to Equation 16. The method steps of FIG. 10, below, may be used in evaluating individual three-dimensional points from the selected patch according to Equation 16. The domain evaluation processing unit 423 may save the evaluated patch to any technically feasible data store. The method terminates in step 990.

Figure 10:
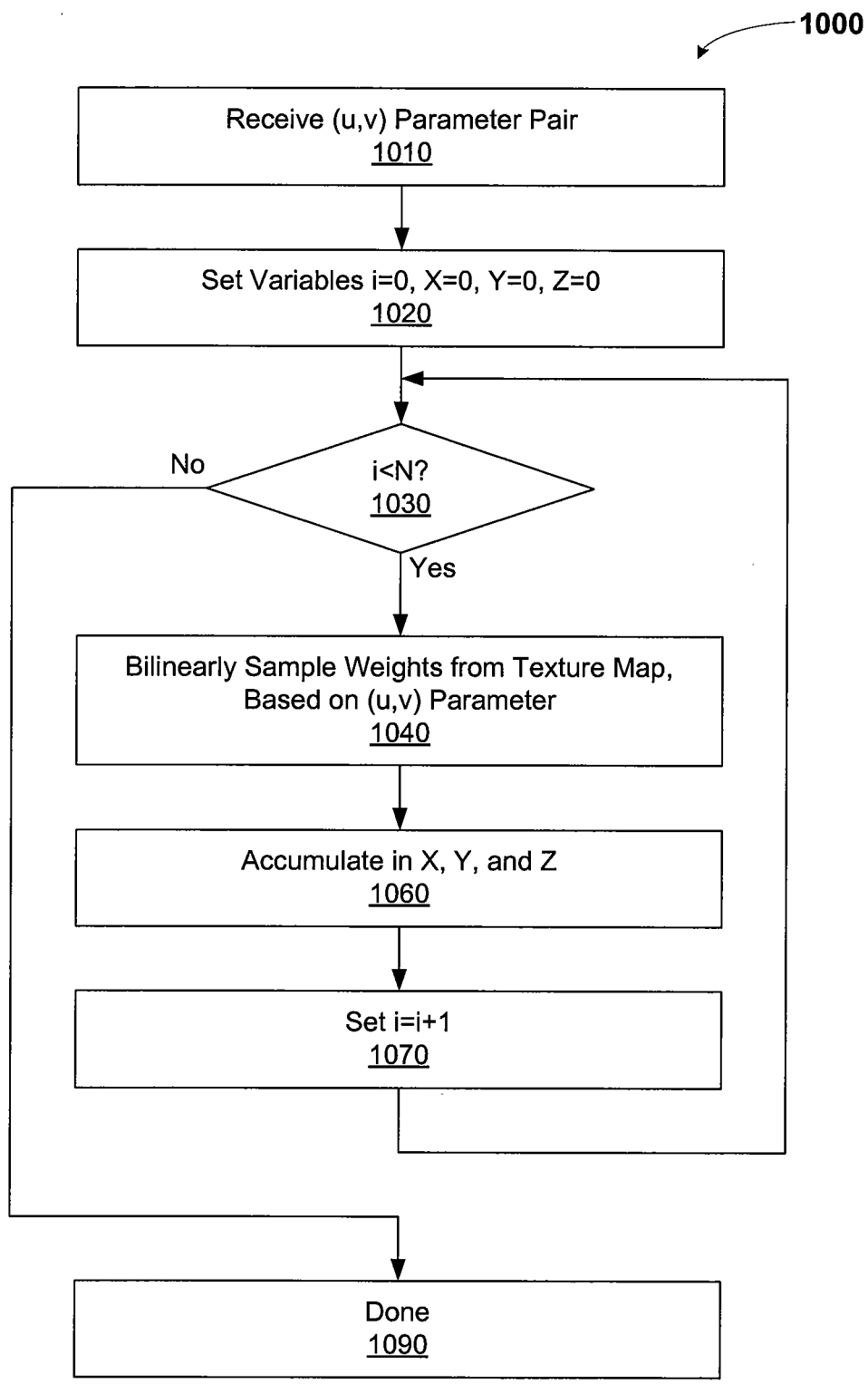
FIG. 10 is a flow diagram of method steps for computing a weighted sum using bilinear sampled weights, according to one embodiment of the present invention.

FIG. 10 is a flow diagram of method steps 1000 for computing a weighted sum using bilinear sampled weights, according to one embodiment of the present invention. Although the method steps are described in conjunction with the systems of FIGS. 1, 2, 3A, 3B, 3C, and 4 persons skilled in the art will understand that any system configured to perform the method steps, in any order, is within the scope of the inventions.

The method begins in step 1010, where an evaluation function within the domain evaluation processing unit 423 receives a (u,v) parameter pair for processing according to Equation 16. In step 1020, a temporary variable, "i" within the domain evaluation processing unit 423 is set to zero. Furthermore, variables "X," "Y," and "Z" are set to zero. If, in step 1030, "i" is less than N, then the method proceeds to step 1040, where N is a number of control points to be accumulated. For a Gregory patch, N is equal to twenty. In step 1040, the domain evaluation processing unit 423 bilinearly samples weights from within a texture map, corresponding to constant array W of Equation 16, based on (u,v), and "i." Persons skilled in the art will recognize that techniques other than bilinear sampling may be used to sample weights form the texture map without departing the scope of the present invention. In step 1060, the domain evaluation processing unit 423 accumulates values in variables "X," "Y," and "Z" corresponding to dimensions X, Y, and Z within a Cartesian space. As taught in Equation 16, above, X is set to X+(weight(u,v)*control_point_x[i]), Y is set to Y+(weight(u,v)*control_point_y[i]), and Z is set to Z+(weight(u,v)*control_point_z[i]). In step 1070, the domain evaluation processing unit 423 increments temporary variable "i" and proceeds back to step 1030.

Returning to step 1030, if "i" is not less than N, then the method terminates in step 1090. Upon termination, a vector formed by variables {X, Y, Z} represents a three-dimensional position vector corresponding to (u,v) for a patch defined by a set of corresponding control points. Tangent vectors may be similarly accumulated.

In sum, a technique for evaluating watertight Gregory patches for Catmull-Clark subdivision surfaces is disclosed for implementation within a standard graphics processing pipeline. The control hull processing unit 421 computes a conventional set of Gregory patch control points, and additionally computes a set of parameters for reconstruction of adjacent control points needed for computing cross boundary tangents. The domain evaluation processing unit 423 computes reconstructed control points and reconstructed control points for adjacent patches based on boundary ownership. The domain evaluation processing unit 423 is able to efficiently evaluate a patch based on a pre-computed array of weight coefficients using a relatively simple weighted sum regime for each parameter pair in (u,v). Watertight evaluation is achieved because only one patch may own a particular boundary, and therefore all control point values are generated within the domain evaluation processing unit 423 from identically generated numerical values from a patch that owns a corresponding boundary.

One advantage of the present invention is that watertight Gregory patch evaluation may be performed with only a marginal increase of computational effort and storage requirements relative to conventional non-watertight evaluation. By contrast, conventional watertight evaluation techniques typically require many times the computational effort and storage requirements of conventional non-watertight evaluation.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for evaluating a parametric patch that shares a boundary with at least one additional parametric patch, wherein each edge of the parametric patch includes an ownership flag that indicates whether the parametric patch owns the edge, the method comprising:

computing one or more control points associated with the parametric patch and parameters related to the at least one additional parametric patch; and transmitting the one or more control points, the parameters and the ownership flags to a processing unit within a graphics processing pipeline, wherein the processing unit is configured to evaluate the parametric patch based on the one or more control points, the parameters and the ownership flags.

2. The method of claim 1, wherein the parameters include at least one control point interior to the at least one additional parametric patch, and wherein computing the parameters comprises computing a weighted sum of a plurality of parametric terms associated with a parametric representation of the at least one additional parametric patch.

3. The method of claim 2, wherein the parameters further include at least one control point residing on an edge of the at least one additional parametric patch and residing closest to the shared boundary, and wherein computing the parameters comprises computing a weighted sum of a plurality of cosine terms, wherein each cosine term is a function of a valence for a shared control point residing on the edge.

4. The method of claim 3, wherein computing the weighted sum of the plurality of cosine terms comprises performing a look-up operation involving a table of pre-computed cosine values.

5. The method of claim 1, wherein ownership of one or more control points residing on the shared boundary is assigned to the at least one additional patch, and the one or more control points associated with the parametric patch are computed based on the one or more control points residing on the shared boundary.

6. The method 1, further comprising reconstructing one or more adjacent control points from the parameters.

7. The method of claim 6, wherein reconstructing the one or more adjacent control points comprises computing a difference between two of the parameters.

8. The method of claim 7, wherein reconstructing the one or more adjacent control points further comprises computing a weighted sum of a plurality of cosine terms, wherein each cosine term is a function of a valence for a shared control point residing on the edge.

9. The method of claim 6, further comprising evaluating the parametric patch based on the one or more control points and the reconstructed one or more adjacent control points.

10. The method of claim 9, wherein evaluating the parametric patch comprises computing a weighted sum of all control points associated with a parametric representation of the parametric patch, and wherein each weight in the weighted sum computation is retrieved from a pre-computed texture of control point weights stored in local memory.

11. A graphics subsystem configured to evaluate a parametric patch that shares a boundary with at least one additional parametric patch, wherein each edge of the parametric patch includes an ownership flag that indicates whether the parametric patch owns the edge, the graphics subsystem comprising:
a control hull processing unit configured to:
compute one or more control points associated with the parametric patch and parameters related to the at least one additional parametric patch, and
transmit the one or more control points, the parameters and the ownership flags to a processing unit within a graphics processing pipeline, wherein the processing unit is configured to evaluate the parametric patch based on the one or more control points, the parameters and the ownership flags.

12. The graphics subsystem of claim 11, wherein the parameters include at least one control point interior to the at least one additional parametric patch, and wherein, when computing the parameters, the control hull processing unit is configured to compute a weighted sum of a plurality of parametric terms associated with a parametric representation of the at least one additional parametric patch.

13. The graphics subsystem of claim 12, wherein the parameters further include at least one control point residing on an edge of the at least one additional parametric patch and residing closest to the shared boundary, and wherein, when computing the parameters, the control hull processing unit is configured to compute a weighted sum of a plurality of cosine terms, wherein each cosine term is a function of a valence for a shared control point residing on the edge.

14. The graphics subsystem of claim 13, wherein, when computing the weighted sum of the plurality of cosine terms, the control hull processing unit is configured to perform a look-up operation involving a table of pre-computed cosine values.

15. The graphics subsystem of claim 11, wherein ownership of one or more control points residing on the shared boundary is assigned to the at least one additional patch, and the one or more control points associated with the parametric patch are computed based on the one or more control points residing on the shared boundary.

16. The graphics subsystem of claim 11, further comprising the domain shader configured to reconstruct one or more adjacent control points from the parameters.

17. The graphics subsystem of claim 16, wherein, when reconstructing the one or more adjacent control points, the domain shader is configured to compute a difference between two of the parameters and compute a weighted sum of a plurality of cosine terms, wherein each cosine term is a function of a valence for a shared control point residing on the edge.

18. The graphics subsystem of claim 16, wherein the domain shader is configured to evaluate the parametric patch based on the one or more control points and the reconstructed one or more adjacent control points.

19. The graphics subsystem of claim 18, wherein, when evaluating the parametric patch, the domain shader is configured to compute a weighted sum of all control points associated with a parametric representation of the parametric patch, and wherein each weight in the weighted sum computation is retrieved from a pre-computed texture of control point weights stored in local memory.

20. A computing system, comprising:
A graphics subsystem configured to evaluate a parametric patch that shares a boundary with at least one additional parametric patch, wherein each edge of the parametric patch includes an ownership flag that indicates whether the parametric patch owns the edge, the graphics subsystem comprising:
a control hull processing unit configured to:
compute one or more control points associated with the parametric patch and parameters related to the at least one additional parametric patch, and
transmit the one or more control points, the parameters and the ownership flags to a processing unit within a graphics processing pipeline, wherein the processing unit is configured to evaluate the parametric patch based on the one or more control points, the parameters and the ownership flags.

* * * * *